US007099039B2

(12) United States Patent
Sussmeier

(10) Patent No.: US 7,099,039 B2
(45) Date of Patent: Aug. 29, 2006

(54) PARALLEL PROCESSING HIGH SPEED PRINTING SYSTEM FOR AN INSERTING SYSTEM

(75) Inventor: John W. Sussmeier, Cold Spring, NY (US)

(73) Assignee: Pitney Bowes Inc., Stamford, CT (US)

( * ) Notice: Subject to any disclaimer, the term of this patent is extended or adjusted under 35 U.S.C. 154(b) by 811 days.

(21) Appl. No.: 10/226,744

(22) Filed: Aug. 22, 2002

(65) Prior Publication Data

US 2004/0036893 A1 Feb. 26, 2004

(51) Int. Cl.
*G06K 1/00* (2006.01)
*G06F 15/00* (2006.01)

(52) U.S. Cl. ........................................ 358/1.5; 358/1.1

(58) Field of Classification Search ................ 705/401; 101/91; 419/9; 355/321, 407, 408; 347/37; 271/65, 3.14, 114; 358/1.5, 1.1
See application file for complete search history.

(56) References Cited

U.S. PATENT DOCUMENTS

| | | | | |
|---|---|---|---|---|
| 3,693,486 A | 9/1972 | Maniaci et al. | ................ | 83/88 |
| 5,208,640 A * | 5/1993 | Horie et al. | ................ | 399/110 |
| 5,730,049 A * | 3/1998 | Broschart | .................... | 101/91 |
| 6,305,858 B1 | 10/2001 | Mugrauer | ................... | 400/625 |
| 6,589,000 B1 * | 7/2003 | Boss | ............................. | 412/9 |
| 2001/0045342 A1 | 11/2001 | Frei | ........................... | 198/358 |
| 2002/0040354 A1 * | 4/2002 | Deshayes et al. | ........... | 705/401 |

FOREIGN PATENT DOCUMENTS

| | | |
|---|---|---|
| DE | WO96/32293 | 10/1996 |
| DE | 1134085 | 3/2000 |
| WO | WO9632293 | * 10/1996 |

* cited by examiner

*Primary Examiner*—King Y. Poon
*Assistant Examiner*—Scott Schlack
(74) *Attorney, Agent, or Firm*—Michael J. Cummings; Steven J. Shapiro; Angelo N. Chaclas

(57) ABSTRACT

A system and a method to control the motion of envelopes within a postage printing module to accommodate the use of slower print techniques and to achieve high throughput in a mail processing system. Envelopes transported in a mail processing system are diverted into two or more parallel print paths. At the parallel postage printing modules envelopes are processed according to a motion profile in which the envelope is decelerated from a transport velocity to a slower printing velocity. After the printing operation has been completed, the envelope is accelerated back to the transport velocity and transferred to a downstream module, where the parallel print paths are merged back into a single print path. The print head is preferably geared to operate in synchronism with the print transport. Further, upon the occurrence of an error condition, such as a jam, the print transports for the parallel paths are decelerated to a stop in such a manner as to preserve the spacing between subsequent envelopes to be the same as if no error condition had occurred. Displacement motion of the print transport during a stoppage or restarting is therefore controlled as a predetermined function, or set of functions, of the displacement of other modules in the system.

20 Claims, 5 Drawing Sheets

PARALLEL PROCESSING HIGH SPEED PRINTING SYSTEM FOR AN INSERTING SYSTEM

TECHNICAL FIELD

The present invention relates to a module for printing postage value, or other information, on an envelope in a high speed mass mail processing and inserting system. Within the postage printing module, the motion of the envelope is controlled to allow high envelope throughput, even if the postage printing device operates at a lower velocity than other parts of the system.

BACKGROUND OF THE INVENTION

Inserter systems such as those applicable for use with the present invention, are typically used by organizations such as banks, insurance companies and utility companies for producing a large volume of specific mailings where the contents of each mail item are directed to a particular addressee. Also, other organizations, such as direct mailers, use inserts for producing a large volume of generic mailings where the contents of each mail item are substantially identical for each addressee. Examples of such inserter systems are the 8 series and 9 series inserter systems available from Pitney Bowes Inc. of Stamford Conn.

In many respects, the typical inserter system resembles a manufacturing assembly line. Sheets and other raw materials (other sheets, enclosures, and envelopes) enter the inserter system as inputs. Then, a plurality of different modules or workstations in the inserter system work cooperatively to process the sheets until a finished mail piece is produced. The exact configuration of each inserter system depends upon the needs of each particular customer or installation.

Typically, inserter systems prepare mail pieces by gathering collations of documents on a conveyor. The collations are then transported on the conveyor to an insertion station where they are automatically stuffed into envelopes. After being stuffed with the collations, the envelopes are removed from the insertion station for further processing. Such further processing may include automated closing and sealing the envelope flap, weighing the envelope, applying postage to the envelope, and finally sorting and stacking the envelopes.

Current mail processing machines are often required to process up to 18,000 pieces of mail an hour. Such a high processing speed may require envelopes in an output subsystem to have a velocity in a range of 80–85 inches per second (ips) for processing. Consecutive envelopes will nominally be separated by a 200 ms time interval for proper processing while traveling through the inserter output subsystem. At such a high rate of speed, system modules, such as those for sealing envelopes and putting postage on envelopes, have very little time in which to perform their functions. If adequate control of spacing between envelopes is not maintained, the modules may not have time to perform their functions, envelopes may overlap, and jams and other errors may occur. In particular, postage meters are time sensitive components of a mail processing system. Meters must print a legible postal indicia on the appropriate part of the envelope to meet postal regulations. The meter must also have the time necessary to perform the necessary bookkeeping and calculations to ensure the appropriate funds are being stored and printed.

A typical postage meter currently used with high speed mail processing systems has a mechanical print head that imprints postage indicia on envelopes being processed. Such conventional postage metering technology is available on Pitney Bowes R150 and R156 mailing machines using model 6500 meters. The mechanical print head is typically comprised of a rotary drum that impresses an ink image on envelopes traveling underneath. Using mechanical print head technology, throughput speed for meters is limited by considerations such as the meter's ability to calculate postage and update postage meter registers, and the speed at which ink can be applied to the envelopes. In most cases, solutions using mechanical print head technology have been found adequate for providing the desired throughput of approximately five envelopes per second to achieve 18,000 mail pieces per hour.

However, use of existing mechanical print technology with high speed mail processing machines presents some challenges. First, some older mailing machines were not designed to operate at such high speeds for prolonged periods of time. Accordingly, solutions that allow printing to occur at lower speeds may be desirable in terms of enhancing long term mailing machine reliability.

Another problem is that many existing mechanical print head machines are configured such that once an envelope is in the mailing machine, it is committed to be printed and translated to a downstream module, regardless of downstream conditions. As a result, if there is a paper jam downstream, a conventional mailing machine could cause collateral damage. At such high rates, jams and resultant damage may be more severe than at lower speeds. Accordingly, improved control and lowered printing speed, while maintaining high throughput rate in a mechanical print head mailing machine could provide additional advantages.

Controlling throughput through the metering portion of a mail producing system is also a significant concern when using non-mechanical print heads. Many current mailing machines use digital printing technology to print postal indicia on envelopes. One form of digital printing that is commonly used for postage metering is thermal inkjet technology. Thermal inkjet technology has been found to be a cost effective method for generating images at 300 dpi on material translating up to 50 inches per second. Thus, while thermal inkjet technology is recognized as inexpensive, it is difficult to apply to high speed mail production systems that operate on mail pieces that are typically traveling in the range of up to 80 ips in such systems.

As postage meters using digital print technology become more prevalent in the marketplace, it is important to find suitable substitutes for the mechanical print technology meters that have traditionally been used in high speed mail production systems. This need for substitution is particularly important as it is expected that postal regulations will require phasing out of older mechanical print technology meters, and replacement with more sophisticated meters. Although digital print technology exists that is capable of printing the requisite 300 dpi resolution on paper traveling at 80 ips, such devices are so expensive as to be considered cost prohibitive. Accordingly, it would be beneficial to have a solution that would allow lower velocity digital print technology, like thermal inkjet technology, to be utilized with the high speed mail production systems.

Some systems that have been available from Pitney Bowes for a number of years address some related issues. These systems utilize R150 and R156 mailing machines with model 6500 postage meters installed on an inserter system. The postage meters operate at a slower velocity than that of upstream and downstream modules in the system. When an envelope reaches the postage meter module, a routine is initiated within the postage meter. Once the envelope is committed within the postage meter unit, this routine is carried out without regard to conditions outside the postage meter. The routine decelerates the envelope to a printing velocity. Then, the mechanical print head of the postage meters imprints an indicia on the envelope. After the indicia is printed, the envelope is accelerated back to close to the system velocity, and the envelope is transported out of the meter.

Using the R150 or R156 mailing machines in this manner postage can be printed on envelopes at a lower print velocity. However, problems still occur for systems operating at higher velocities, such as 80 ips. At this higher speed, the time interval between consecutive envelopes is so short that the R150 and R156 machines cannot reset itself in time to print an indicia on a second envelope. To solve this problem, Pitney Bowes has offered a solution for number of years utilizing two mailing machines arranged serially in the envelope transport path. A diagram of this prior art system is depicted in FIG. 1.

In this serial mailing machine solution, envelopes are transported along transport path 10. When a first of a series envelopes reaches the first serial mechanical mailing machine 11, the first envelope is decelerated for a printing operation by postage meter 14. After printing is complete, the first envelope is carried away from the first serial machine 11 via transport 12 to the second serial mechanical mailing machine 13.

At the second mailing machine 13, the first envelope is typically decelerated to the print velocity. However, since an indicia has already been printed on the first envelope, no printing operation is performed by the second postage meter 15. The first envelope is then accelerated back to the system velocity and carried out of the serial postage printing arrangement.

The motion control of deceleration and acceleration at the second postage meter 15 without performing a print operation is done in order to maintain the displacements of consecutive envelopes in the system. Failure to subject subsequent envelopes to the same displacements may result in one envelope catching up to the other and causing a jam.

Following the first envelope, a second envelope arrives at the first mailing machine 11. The second envelope is subjected to the deceleration and acceleration motion profile. In a high speed system, however, the first postage meter 14 may not have had time to reset to print another indicia. Accordingly, the second envelope passes through the first mailing machine 11 without a printing operation. The second envelope is then passed via transport 12 to the second mailing machine 13 where it is again decelerated to the print velocity. This time, mailing machine 13 does perform a printing operation and an indicia is printed on the second envelope by postage meter 15. Mailing machine 13 then accelerates the envelope back to the system velocity, and the second envelope is carried away downstream.

In this manner, some of the shortcomings of conventional mailing machines are avoided by allowing the serial mailing machines 11 and 13 to alternately take turns printing indicia on every-other envelope. One disadvantage of this serial arrangement is that it remains very sensitive to gaps sizes between consecutive envelopes. Gaps between subsequent envelopes are shortened every time a lead envelope undergoes the printing motion profile. If an error occurs in the processing to make the gap size smaller than expected, envelopes can catch-up to one another, and a paper jam can result. Also, the R150 and R156 mailing machines are a bit too long to have time to carry out printing motion profile before the arrival of the next envelope, and to still have some margin for error in the arrival of a subsequent envelope. As a result, envelopes can be passed off between sets of nips that are not going at the same speed, creating potential for pulling or buckling. Accordingly, a solution with better space utilization and that is less sensitive to gap size variation is desirable.

Another problem with conventional postage meters used in high speed inserter systems is that they are inflexible in adjusting to conditions present in upstream or downstream meters. For example, if the downstream module is halted as a result of a jam, the postage meter will continue to operate on whatever envelope is within its control. This often results in an additional jam, and collateral damage, as the postage meter attempts to output the envelope to a stopped downstream module.

SUMMARY OF THE INVENTION

The present application describes a system and a method to control the motion of envelopes within a postage printing system to accommodate the use of slower print techniques (digital or mechanical) in attempting to achieve high throughput in a mail processing system. A system according to the present invention utilizes parallel path printing using at least two postage printing devices. Using the parallel arrangement, documents may be slowed down for printing operations in the parallel paths, without risk of a subsequent document arriving before the printing operation is complete, and allowing for sufficient time to reset the postage metering devices.

At the input to the printing system, a diverting mechanism, preferably a flipper gate, alternately directs consecutive documents into separate parallel printing paths. A first path directs documents to a first printing module, and a second path alternately directs every other document to a second printing module. To avoid bending and damaging the documents, the diverter redirects the documents at oblique angles from the original transport path.

Documents are transported through the diverting mechanism at the nominal system transport velocity. However, once a document comes under the control of one of the postage printing modules, it is decelerated in accordance with a predetermined motion profile. Printing is carried out at a lower print velocity. After printing is complete, documents are accelerated back to the transport velocity to exit the printing module. As a result of the parallel arrangement, a first envelope need not have completed its printing motion profile before a subsequent envelope arrives at the other postage printing device.

Downstream of the postage printing modules, the printed documents are merged back into a single transport path, and are transported away for further processing.

The present invention may be utilized in connection with documents that are transported in horizontal or vertical orientations, or at any angle in between. In a horizontal embodiment, one print module is may be positioned above a plane of the transport path, while the other print module is positioned below. In an alternative horizontal embodiment, the transport path may be split into left and right parallel paths, allowing print modules to be positioned side-by-side for horizontal document processing. Similarly, in an embodiment for handling vertically oriented documents, one parallel print module is located to the left of the vertical transport path, while the other is to the right of the vertical transport path.

In a preferred embodiment, print heads of the parallel print modules are geared to operate in synchronism with the print transports, such that an image will not be distorted if there is a variation in print velocity.

Another preferred embodiment ensures that correct displacement is maintained between subsequent envelopes under the control of the invention in the event of a stop and/or restart of the system resulting from a stoppage condition, such as an envelope jam. When documents are within the print transports during a stoppage condition, the envelope must be decelerated to a stop, so as not to create further jams or collateral damage.

In most modules in the system, a linear uniform deceleration is preferred to minimize disruption of the desired spacing between mail pieces being processed. For the parallel postage printing modules of the present invention, however, optimal performance may require that deceleration not occur in the same uniform linear fashion as the rest of the system. Rather, deceleration is preferably controlled to maintain the relative displacement of envelopes in the postage printing modules with respect to upstream and downstream modules. Because displacements vary based on decelerations and accelerations in the print motion profile, a uniform stopping and starting of the print modules to mirror other modules will result in documents spaced differently than originally intended. Such changing in document gaps may result in further jams or misprocessing.

For this reason, the deceleration and acceleration resulting from the stoppage condition is controlled to maintain relative displacements as those displacements would have been if the stoppage condition had not occurred. To achieve this result, a controller for the print modules controls the displacement of the print modules according to a predetermined algorithm. This algorithm relates displacements of the print modules with other modules for segments of the motion profile as they would have been executed during normal operation. During the stoppage condition, deceleration and acceleration of the print modules is thus controlled as a predetermined function, or set of functions, of the displacements in other transport modules. The appropriate function is determined as a result of the position of the envelope in the print modules during the course of the stoppage condition.

This displacement mapping functionality of the preferred embodiment operates cooperatively with the gearing of the print head mechanisms to the print transports. In that preferred embodiment, stopping and restarting of the print modules will not affect printing of images on documents, even if a printing operation had already begun at the time of the stoppage.

Further details of the present invention are provided in the accompanying drawings, detailed description and claims.

DETAILED DESCRIPTION

Figure 1:
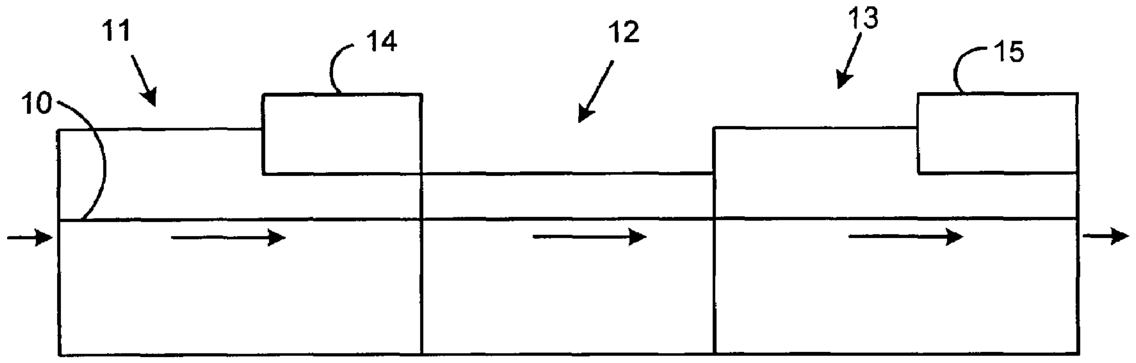
FIG. 1 ( PRIOR ART)
FIG. 1 depicts a prior art system using two serially arranged postage meters.
Figure 2:
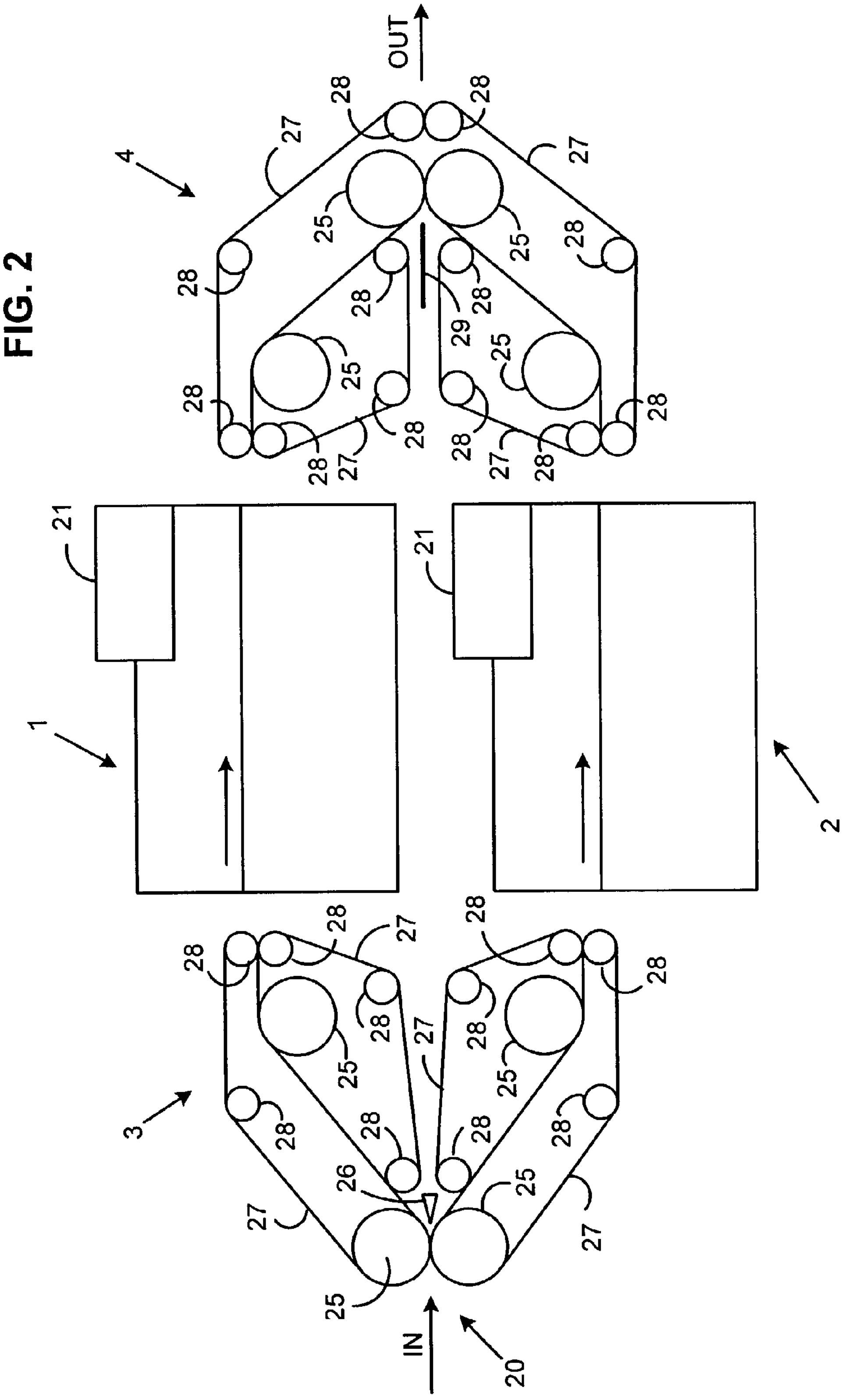
FIG. 2 depicts an embodiment of a parallel postage printing system for use with mechanical postage printing devices.

In FIG. 2, a parallel path printing system for use with parallel mailing machines 1 and 2 is depicted. This embodiment is suitable for use with pre-existing mailing machines, not necessarily designed for integration into a high speed inserting system. Mailing machines 1 and 2 further comprise postage meters 21, or other suitable printing device, at a downstream end of the mailing machine transports. Postage meters 21 print indicia on the envelopes in the respective parallel printing paths, and track postal accounts.

All of the embodiments of the parallel path printing systems in this application may be operated for transporting envelopes in horizontal or vertical orientations, or any angled orientation in between. For envelopes being transported in a horizontal orientation, mailing machines 1 and 2, for example, may be Pitney Bowes R150 or R156 mechanical mailing machines. For envelopes transported in the vertical orientation, mailing machines 1 and 2, for example, may be vertical inkjet systems similar in operation to the JetMail franking machine offered by Francotyp-Postalia AG. Thus, FIG. 2 should be regarded as a side view with respect to horizontal printing mailing machines, and as a top view for vertical printing mailing machines. Otherwise, the principles of operation are the same throughout, irrespective of the angle of orientation of the document. As a practical matter, most conventional "vertical" processing mailing machines are usually inclined to some degree.

In a further alternative embodiment of the present invention, mailing machines 1 and 2 process horizontally oriented documents in a side-by-side arrangement. Under this arrangement an upstream path splitting module 3 includes a diverter mechanism that splits the single horizontal document transport path into two diverging horizontal transport paths. An appropriate diverter mechanism may be sets of one or more nips that rotate alternately to two angled positions at oblique angles away from the original direction of travel. After the angled nips send one envelope down one path, the nips can rotate to send the subsequent envelope down the other path. An advantage of the side-by-side arrangement of horizontal mailing machines 1 and 2 is that the need for bending of the envelope around a nip (such as nip 25) is avoided. Such bending of the flat envelope may introduce a risk that an envelope flap might open or become damaged.

Figure 3:
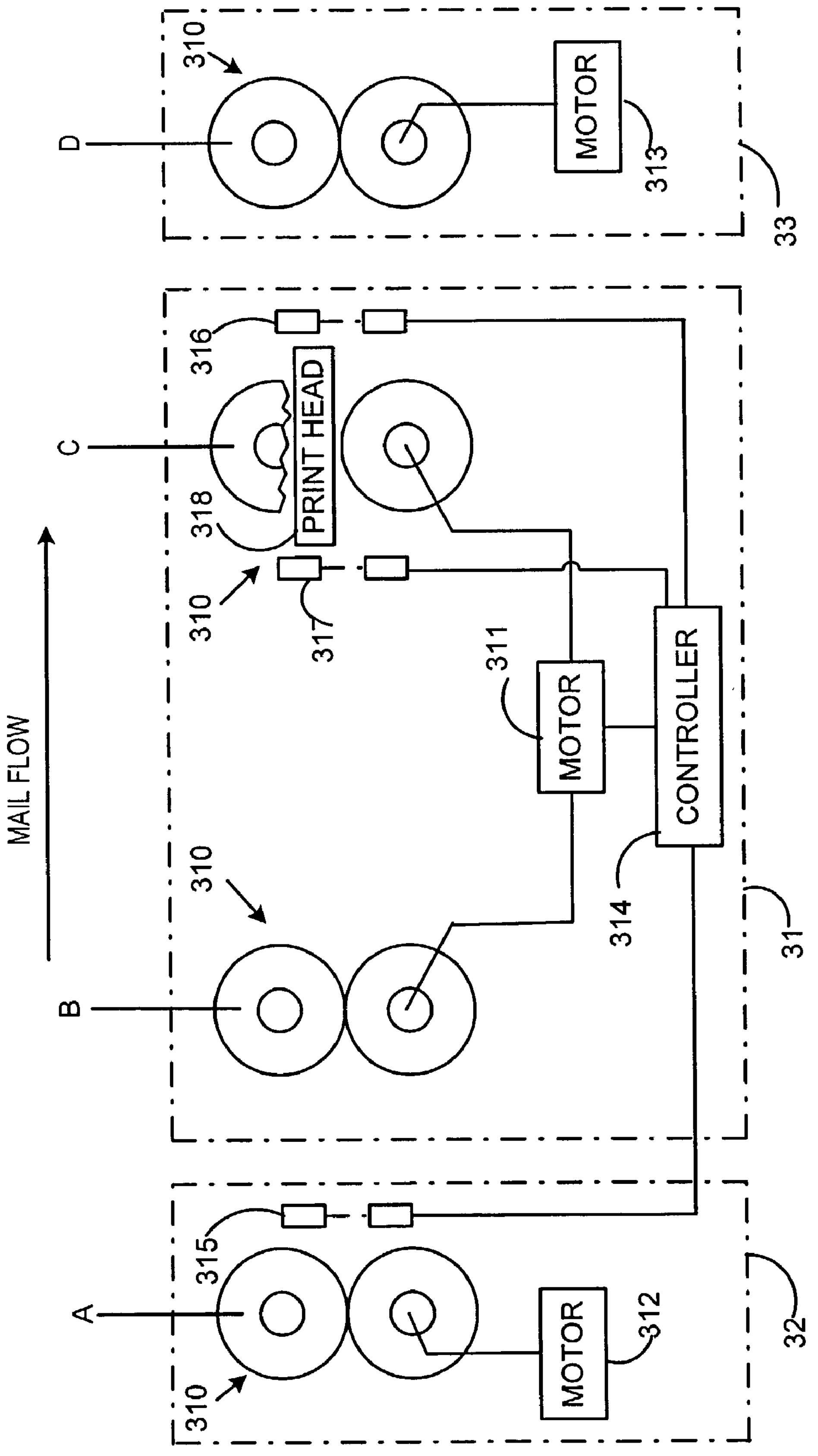
FIG. 3 depicts an embodiment of a postage printing module for use with the present invention.

In the embodiment depicted in FIG. 3, envelopes are transported to the printing system via transport path 20, traveling at a nominal system transport velocity. In the preferred embodiment, the nominal transport velocity is approximately 80 ips. In this embodiment, at the beginning of the parallel path printing system envelopes are separated and transported to the parallel mailing machines 1 and 2 by a path splitting module 3.

The input to the path splitting module 3 comprises two large diameter rollers 25. Downstream of the input nip formed by the rollers 25 a flipper gate 26 has at least two positions to deflect envelopes into one of two alternate transport paths. In the embodiment shown, the two alternate transport paths are comprised of belts 27 supported and driven on sets of rollers 25 and 28.

In the preferred embodiment, the flipper gate 26 alternately diverts the envelopes to the two alternate paths. This alternation may be controlled via a predetermined timing scheme, or by sensing a location of an envelope in the system. The flipper gate 26 may switch positions after it is detected that a tail edge of an envelope has cleared the flipper. Alternatively flipper gate 26 may switch positions upon detecting that a next envelope is approaching.

In order that envelops not be subjected to undue bending during the diverting process, it is preferred that the rollers 25 forming the nip at the entrance to the path splitting module 3 be of a large diameter so that turning of the envelope into the alternate paths is gradual, and not so sharp as to damage the envelope. The outer turning radius of rollers 25 thus form an oblique turning angle suitable for this purpose. Similarly at other turning points in the alternate transport paths in the splitting module 3 and the merging module 4, the same large diameter rollers are used. Throughout the splitting module 3 and the merging module 4, the transports operate at the same nominal system velocity as the modules upstream and downstream of the parallel path printing arrangement.

The path splitting module 3 delivers the diverted envelopes to the respective parallel postage meters 1 and 2. As the envelopes alternately arrive at the postage meters 1 and 2, a print motion control profile is executed upon them, as described in more detail below. After printing, the envelopes are accelerated back to the nominal system velocity, and are output from the mailing machines 1 and 2.

Downstream of the mailing machines 1 and 2, the envelopes enter a merging module 4. Merging module 4 returns the envelopes from the alternate paths back to a single processing path. Using transport arrangement of belts 27 and rollers 25 and 28, the merging module transports the envelopes from the outputs of the parallel mailing machines towards one another. A merge deflector 29 deflects the arriving envelopes from the two paths back into the single path formed by the nips at the output end of the merging module 4. Merging module 4 then feeds the single stream of envelopes at the nominal system velocity to downstream modules for further processing.

In the embodiment of the invention operating upon horizontally oriented envelopes, flipper gate 26 will send the envelopes to alternate paths that are above and below the plane of the envelope transport at the input to the system. In this preferred embodiment, space is conserved by placing the two mailing machines 1 and 2 one directly over the other. Similarly, for the vertical envelope embodiment, the mailing machines 1 and 2 are placed side-by-side.

In FIG. 3, an exemplary postage printing mechanism and transport for use with the present invention is depicted. A postage printing module 31 for use with the present invention may be a mechanical or digital printing device with corresponding transport and control mechanisms. The features of print module 31 are accordingly described generically so as to be applicable to all such kinds of postage printing devices. As such, postage printing module 31 corresponds to mailing machines 1 and/or 2 of FIG. 2. The upstream module 32 corresponds with the output of the path splitting module 3. The downstream module 33 corresponds with the input to the merge module 4.

In the embodiment depicted in FIG. 3, the modules use sets of upper and lower rollers 310, called nips, between which envelopes are driven in the flow direction. In one embodiment, rollers 310 are hard-nip rollers to minimize dither. As an alternative, the transport mechanism may be comprised of belts supported and driven by sets of rollers 310. The overlapping sets of conveyor belts provide the transport path between which envelopes are transported.

Print head 318 is preferably located at or near the output end of the print transport portion of the postage printing module 31 (see location C). To comply with postal regulations the print head 318 should be capable of printing an indicia at a resolution of 300 dots per inch (dpi). In an exemplary embodiment, the print head 318 is an ink jet print head capable of printing 300 dpi on media traveling at 50 ips. Alternatively, the print head 318 can be any type of print head, including those using other digital or mechanical technology, which may benefit from printing at a rate less than the system velocity.

The rollers 310 for postage printing module 31, and modules 32 and 33 are driven by electric motors 311, 312, and 313 respectively. Motors 311, 312, and 313 are preferably independently controllable servo motors. Motors 312 and 313 for upstream and downstream modules 32 and 33 drive their respective rollers 310 at a constant velocity, preferably at the desired nominal velocity for envelopes traveling in the system.

Thus in the preferred embodiment, upstream and downstream modules 32 and 33 will transport envelopes at 80 ips in the flow direction.

Motor 311 drives rollers 310 in the postage printing module 31 at varying speeds in order to provide lower velocity printing capabilities. Postage printing module motor 311 is controlled by controller 314 which, in turn, receives sensor signals including signals from upstream sensor 315, downstream sensor 316, and trigger sensor 317. Sensors 315 and 316 are preferably used to detect the trailing edges of consecutive envelopes passing through the postage printing module 31, and to verify that the printing motion control adjustment only occurs while a single envelope is within the postage printing module. Trigger sensor 317 determines that an envelope to be printed with an indicia is in the appropriate position to trigger the beginning of the print motion control scheme described further below.

Sensors 315, 316, and 317 are preferably photo sensors that are capable of detecting leading and trailing edges of envelopes. The preferred positioning of the sensors, and the utilization of signals received from the sensors are discussed in more detail below.

One aspect of the system relates to the relative positioning of the transport mechanisms between postage printing module 31 and the other modules. Referring to FIG. 3, the location of the output of the transport for upstream module 31 is location A. The location for the input to the print transport of postage printing module 31 is location B, and the output of the print transport mechanism for postage printing module 31 is location C. The input for the transport of downstream module 33 is location D.

In the exemplary embodiment shown in FIG. 3, the transport mechanisms are nip rollers 310 for each of the modules. Accordingly locations A, B, C, and D correspond to the respective locations of input and output nip rollers 310 in that embodiment. The modules may also include other rollers 310 at other locations, such as the set depicted in FIG. 3 between locations B and C. In the example depicted in FIG. 3, the three nip rollers sets 310 in postage printing module 31 will be driven by motor 311. To maintain control over envelopes traveling through the system, consecutive distances between rollers 310 must be less than the shortest length envelope expected to be conveyed. In the preferred embodiment, it is expected that envelopes with a minimum length of 6.5" will be conveyed. Accordingly and the rollers 310 will preferably be spaced 6.0" apart, so that an envelope can be handed off between sets of rollers 310 without giving up control transporting the envelope at any time. In particular, the predetermined length of 6.0" between rollers in useful between modules, i.e., between 31 and 32, and between 31 and 33, while it may be found to be beneficial to use lesser distances between rollers 310 within any one module.

Upstream sensor 315 is preferably located at or near location A, while downstream sensor 316 is preferably located at or near location C. Trigger sensor 317 is preferably located upstream from print head 318 by a sufficient distance to permit deceleration of the print transport from the nominal transport velocity to the print velocity upon the detection of a lead envelope edge. The trigger sensor 317 may be located any distance upstream from the minimum deceleration point, even as far upstream as upstream sensor 315, so long as the motion control profile determined by controller 314 is adjusted accordingly.

Controller 314 controls the motor 311 in accordance with a print motion control profile in order to achieve the goals of (1) reducing the speed of an envelope so that the low velocity print head 318 can print an indicia, and (2) controlling the motion of the envelopes so that consecutive envelopes to not interfere with each other.

Figure 4:
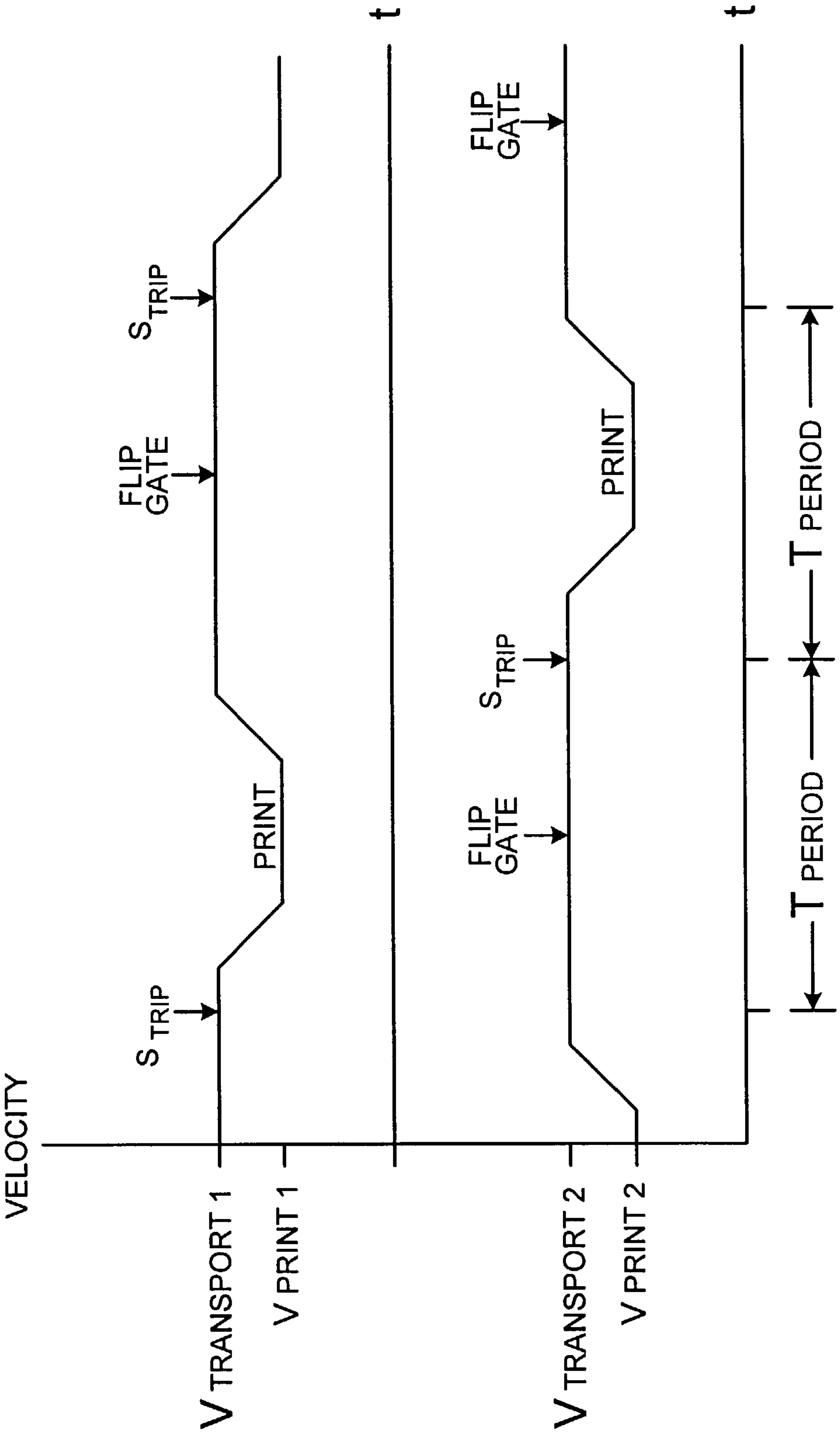
FIG. 4 depicts exemplary motion profiles for postage printing modules in connection with a preferred embodiment of the parallel postage printing system.

Print motion control profiles for use with the present invention are depicted in FIG. 4. FIG. 4 is a graph of velocities of the transport mechanisms for the postage meters 1 and 2 (or more generically print modules 31) in each of the parallel print paths. It can be seen that the parallel print modules 31 both have the same motion profiles, but offset from one another to reflect the different arrival times of the consecutive envelopes.

The motion control profiles for each of the parallel print modules 31 include transport velocity ($V_{transport1}$ or $V_{transport2}$) an a print velocity ($V_{print1}$ or $V_{print2}$). The transport velocity is nominally 80 ips, while the print velocity is nominally 50 ips. At the nominal transport speed the period ($T_{period}$) between envelopes reaching the same stage in their processing is approximately 200 ms. In every cycle, at the timing designated "FLIP GATE," the flipper gate 26 switches position diverting an envelope to the print path different than the preceding envelope.

After an envelope has been diverted by flipper gate 26 to its respective parallel path, the envelope is transferred to the control of the print module. Upon reaching a trigger location within module 31, a printing motion profile is initiated. The timing of the trigger location is indicated at $S_{trip}$ in FIG. 4.

The triggering or tripping location at $S_{trip}$ may only occur after the tail end of the envelope has left the upstream module 32, as discussed with respect to FIG. 3 above. Since the first envelope is under the sole control of the print module 31, the print transport may slow down to allow the slower velocity printing. Controller 314 can begin the necessary deceleration by sensing the lead edge of the first envelope with the trigger sensor 317. Alternatively, the deceleration can begin as a result of upstream sensor 315 detecting the tail end of the first envelope has left upstream module 32. In this alternate arrangement, the length of the print module 31 can be minimized because the low velocity print operation can be initiated and finished as soon as possible. Because conservation of floor space, or "footprint," is typically important with a mail processing system, the preferred embodiment is designed to minimize the length of the device necessary.

After $S_{trip}$ on the motion profile, the nips 310 of the print module 31 initiate a predetermined deceleration to reach the desired print velocity ($V_{print1}$ or $V_{print2}$), in this case 50 ips. The print transport then operates at 50 ips to transport the envelope a predetermined distance while an indicia is printed. In this exemplary embodiment, the print distance is four inches. After the predetermined print distance has been completed, the envelope is accelerated back to the transport speed.

During the acceleration portion of the motion profile, the tail end of the first envelope leaves the nips 310 at point B, and the envelope is under the exclusive control of the nips 310 at point C. Shortly thereafter, the lead edge of the first envelope reaches the first nip of the downstream module 33, at location D. At this point in time, the first envelope is under the control of modules 31 and 33 and variations in the print transport speed are not permissible.

Using the motion profile depicted in FIG. 4, envelopes in the parallel print paths can be slowed for lower speed printing with no risk of a following envelope from closing the gap and colliding with the decelerated envelope. Since envelopes in the parallel paths undergo the same motion profiles, their relative spacing after being merged back together as it was prior to being split.

The exemplary motion profile described above complies with requirements necessary for a successful reduced velocity print operation. As mentioned above, when print speed adjustment is performed on an envelope, print module 31 must have total control of the envelope. For example, the envelope cannot reside between nip rollers 310 at location A or D during execution of the print motion control profile. Additionally, in the preferred embodiment, envelopes upstream and downstream of the envelope must be completely out of print module 31, i.e., they cannot reside anywhere between nip rollers 310 between locations B and C during the execution of the print motion profile. Accordingly, in the preferred embodiment, print module 31 will only perform the print motion control profile (1) after the trail edge of the envelope has exited upstream module 32 at location A; and (2) after the trail edge of the downstream envelope has exited print module 31. Similarly, in the preferred embodiment, print module 31 must complete the print motion control profile (1) before the lead edge of the upstream envelope has reached print module at location B; and (2) before the lead edge of the envelope has reached the downstream module 33 at location D. By splitting the envelope printing duties between two print paths, these conditions are more easily met, and the printing portion of the system is more likely to tolerate errors in the gap lengths between envelopes.

In a further preferred embodiment of the present invention, to ensure accurate printing, the rate at which the print heads 318 prints the indicia can be electronically or mechanically geared to the speed of the print transports in the print modules 31. In such cases, under circumstances where the print transports are operating outside of nominal conditions, a correct size and resolution print image can be generated. In the digital printing version of this preferred embodiment, controller 314 and servomotor 311 are geared to the same velocity and timing signals to provide that the transport and printing are always in synchronism.

Another preferred embodiment of the present invention addresses a problem that occurs when the parallel print modules 31 are forced to deviate from the motion control profiles depicted in FIG. 4. For example, in a conventional inserter system, when an envelope jam occurs downstream from the postage printing portion of the system, upstream and downstream modules typically come to a halt in accordance with a uniform linear deceleration profile. Unfortunately, in conventional inserter systems, the postage printing modules have no mechanism for halting envelopes that are committed within the postage meter. As a result, additional paper jams and damaged envelopes commonly occur as the postage printing module forces envelopes against a halted downstream module.

To address this problem, in the preferred embodiment of the present invention the print modules 31 will also decelerate to a stop upon the occurrence of stoppage conditions. Stoppage conditions occur upon detection of jams, detection that mail pieces are out of order, or detection of equipment malfunctions. Stoppage conditions also include routine starting and stopping of the inserter system in the midst of a mail production job. In the discussion below, examples are provided wherein the stoppage condition is based on the occurrence of an error, or exception condition.

A related co-pending U.S. patent application Ser. No. 10/213,204, titled METHOD AND SYSTEM FOR HIGH SPEED DIGITAL METERING USING LOW VELOCITY PRINT TECHNOLOGY, filed Aug. 5, 2002, by the same inventor as the present application, also discusses a solution to this problem. This co-pending application is hereby incorporated by reference.

If the print head 318 is geared to the print transport motor 311, then an envelope can be stopped anywhere in the print module 31 upon the occurrence of an exception event without damaging the envelopes, and without compromising the image to be printed on the envelope. After the error condition has passed, print module 31 can be accelerated back to the velocities in accordance with the motion profiles depicted in FIG. 4.

A uniform linear deceleration and acceleration during an exception condition is preferred for the upstream and downstream modules 32 and 33. However, a deceleration and acceleration having that same uniform linear profile may cause problems in print module 31. For example, if a print transport was about to reach the printing portion of the motion profile of FIG. 4 when the exception condition occurred, the print transport could decelerate down to zero velocity in a linear fashion the same as modules 32 and 33. However, after the exception condition has been cleared, the envelope in the print module 31 will be closer to the downstream module 33 than it would have been if the normal motion profile had been executed. This is because during the uniform deceleration, the print module 31 has essentially skipped a portion of the motion profile. During this "skipped" portion, it was intended that the envelope decelerate to the print velocity. A result of that deceleration would have been an increase in the gap with a downstream envelope and a decrease in a gap with an upstream envelope. A uniform shutdown profile for all modules interferes with this planned variation in gap sizes.

Accordingly, the present invention maintains the expected displacements between consecutive documents by controlling the transport of envelopes in print modules 31 as a function of the displacement positions of upstream and/or downstream modules. Thus, the variations in velocity that result from the stoppage and starting in an exception condition should not affect the relative spacing of the envelopes.

In the equations provided below for determining the appropriate displacement relationship, the velocity variables will be eliminated, and positions of the transports expressed in terms of variable displacements and known constants. The desired displacements of the print modules 31, as they would have resulted from performance of the motion profile under nominal conditions, must be describable in terms of the position of upstream or downstream modules. Also, the descriptions must be expressed in terms of the displacement relationships that would have resulted from the distinct segments in the motion profile.

For example, for the portion of the motion profile where the print modules 31 should operate at the transport velocity, there should be a one-to-one correspondence in the displacements produced by an upstream module 32 and print module 31. Thus, if an exception condition occurs while an envelope is at a location within the print module 31 where it would normally be traveling at the transport velocity, then the deceleration of the print module 31 during an exception condition will mirror that of the upstream module 32. For this exemplary situation, the equation relating the displacement position of the print module 31, "$P_1$," to the displacement position of the upstream module 32, "$P_2$," will be:

$$P_1 = P_2. \quad [1]$$

If the envelope is located at a position where it would normally be subject to deceleration in preparation for a printing operation, then, during an exception condition, print module 32 must decelerate more quickly than upstream module 32 in order that the shortening of the gap between envelopes in those modules be preserved. To derive the appropriate displacement relationship for this segment of the print module 31 motion, the following symbols are defined:

v=velocity of the print module 31 transport;

$V_{transport}$=the transport velocity for the system, (nominally 80 ips);

$V_{print}$=the print velocity for print module 31 during the printing segment of the motion profile (nominally 50 ips);

$a_1$=acceleration that print module 31 would normally undergo in the deceleration segment of the motion profile (deceleration being a negative value acceleration) (nominally−1500 in/sec$^2$);

a2=acceleration that print module 31 would normally undergo in the acceleration segment of the motion profile (nominally 1500 in/sec$^2$);

$p_{decel}$=the displacement that print module 31 normally undergoes during the deceleration portion of the motion profile (nominally 1.3 inches); and $p_{accel}$=the displacement that print module 31 normally undergoes during the acceleration portion of the motion profile (nominally 1.3 inches).

During normal operation in accordance with the motion profile, the displacement position, $P_1$, of the print module 31, starting at the beginning of the deceleration segment, is described according to the equation:

$$P_1 = (v^2 - v_{transport}^2)/2a_1 \quad [2]$$

An expression can also be derived relating the velocity, v, of print module 31 as a function of the displacement position, $P_2$, of upstream module 32, during normal operation of the deceleration portion of the motion profile:

$$V = ((v_{print} - v_{transport})/p_{decel})P_2 + V_{transport} \quad [3]$$

Thus, an equation relating $P_1$ and $P_2$, independent of instantaneous velocities, is derived by substituting the value of "v" derived in equation [3] into equation [2]. Performing this substitution, displacement relationship between print module 31 with upstream module 32, for the deceleration segment of the motion profile is:

$$P_1 = ((((v_{print} - v_{transport})/p_{decel})P_2 + V_{transport})^2 - V_{transport}^2)/2a_1 \quad [4]$$

Using this relationship in equation [4], controller 314 of print module 31 can adjust the displacement of print module 31 when an envelope is present at a location where it normally would undergo the deceleration portion of the motion profile.

The next segment of the motion profile for discussion is the printing portion. During that segment the envelope is transported at a constant velocity, $v_{print}$. Accordingly, for that segment, the relative displacements that would be seen in upstream module 32 and print module 31 would be described as a fixed ratio. This relationship is described by the following equation:

$$P_1=(V_{print}/v_{transport})P_2 \quad [5]$$

It should be noted that the appropriate displacement relationship may change while the print module 31 is decelerating to a stop. For example, an envelope that is slightly upstream of trigger sensor 317, and traveling at the transport velocity, may begin to stop in accordance with the displacement relationship described in equation [1], above. However, during the deceleration, but before stopping, the envelope may reach the trigger position marked sensor 317. After the trigger sensor 317 has been reached controller 314 will switch the displacement relationship to that described in equation [4] above. Thus, as many different displacement relationships may be utilized as may be necessitated by the positions reached by the envelope during the deceleration process. Thus, if the deceleration were protracted to reach a location where a printing segment was intended, then displacement may be controlled in accordance equation [5] above. Also, based on the gearing of the print head 317 with the motor 311, the print head may begin printing a portion of the image on the envelope before it stops. When the print module 31 restarts, the geared print head will also resume printing at the appropriate geared speed.

A final segment of the motion profile is the acceleration of the envelope from the print velocity, back to the transport velocity. The displacement mapping relationship for this segment can be derived in the same way as for equation [4] above. A difference in the result being that this acceleration segment is causing an envelope in the print module 31 to increase its distance from a subsequent envelope in upstream module 32. Accordingly, the displacement relationship when an envelope is at the acceleration motion profile segment during a stopping or restarting condition is as follows:

$$P_1=((((v_{transport}-v_{print})/p_{accel})P_2+v_{print})^2-v_{print}^2)/2a_2 \quad [6]$$

Displacement information for respective print, upstream, and downstream modules 31, 32, and 33 may typically be monitored via encoders in motors 311, 312, and 313. The encoders register the mechanical movement of the module transports and report the displacements to controller 314 for appropriate use by controller 314 to maintain correct displacement mapping between the modules.

Because of their offset motion profiles, the parallel print modules 31 are decelerating and accelerating at different times, as seen in FIG. 4. Thus, the calculations and controls discussed above for regulating displacements during a stoppage condition must be performed separately for each print module 31.

Figure 5:
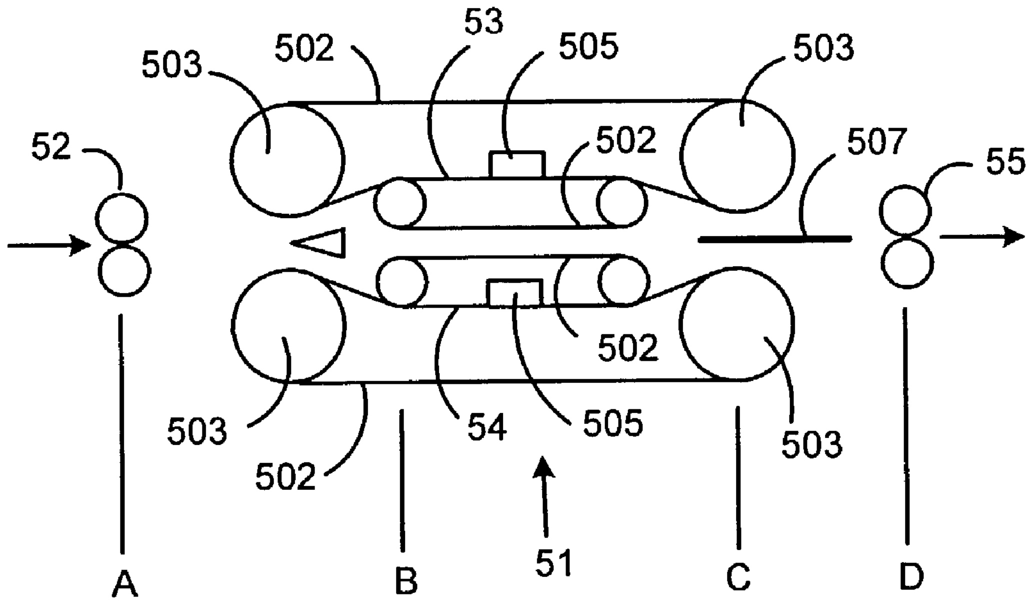
FIG. 5 depicts an embodiment of a parallel postage printing system for use with digital postage printing devices.

In FIG. 5, an alternative embodiment for the parallel path print system in FIG. 2 is depicted as parallel print module 51. In the embodiment of FIG. 5, the printing mechanisms have been more directly integrated with the parallel path transports. As such, parallel print module 51 is more suitable for systems that are not attempting to utilize "off the shelf" mailing machines. Rather, the print transports in this embodiment also serve as part of the mechanism for splitting the transport path. In a preferred embodiment, a smaller digital print head 505 is used for printing postage indicia. The print motion control for this embodiment is the same as that discussed above with respect to FIGS. 2–4.

From upstream, nip rollers 52 feed envelopes to the parallel print module 51. For purposes of the motion control analysis discussed above, nip rollers 52 are at the same location A, at the downstream end of an upstream module 32, as depicted in FIG. 3. At the input to the print module 51, a flipper gate 501 alternately diverts envelopes into one of two parallel printing paths 53 or 54. In comparison to the embodiment in FIG. 2, it can be seen that this arrangement eliminates the need for the path splitting module 3 and the merge module 4.

The transports for the parallel printing paths are comprised of belt pairs 502 driven and supported by rollers 503. As can be seen at location B in FIG. 5, a nip contact for transporting envelopes is formed by the contact between a portion of a belt 502 and an offset roller 503. Within the parallel printing paths 53 and 54 the motion profile control for the envelopes is the same as that described above, i.e., decelerating the envelope to a print velocity, performing a print operation for on a predetermined length of envelope, and accelerating back to the system transport velocity.

Print heads 505 are located proximally to a downstream end of the printing paths 53 and 54. Also, as discussed above, in the preferred embodiment the print heads 505 are electronically geared to operate in synchronism with their respective transports.

At the output end of the printing paths 53 and 54, a merge deflector 507 guides the envelopes out of the print mechanisms to a downstream set of nip rollers 55. For purposes of the motion control analysis discussed previously, nip rollers 55 are at location D, at the upstream end of an downstream module 33 as depicted in FIG. 3.

Figure 6:
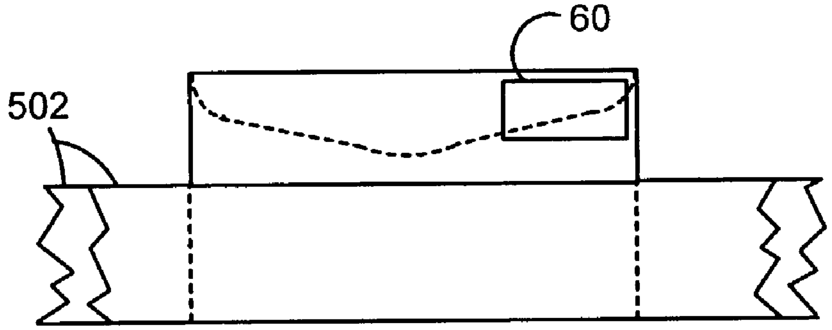
FIG. 6 depicts a preferred envelope transport arrangement within a postage printing module used with the present invention.

FIG. 6, depicts a preferred manner in which belts 502 grip envelopes in the printing system. Belts 502 grip envelopes lengthwise along their lower portions, so as to leave a print region 60 exposed for the print head 505 to print an indicia. This arrangement of FIG. 6 is preferred for systems transporting envelopes in horizontal or vertical orientations.

Although the invention has been described with respect to a preferred embodiment thereof, it will be understood by those skilled in the art that the foregoing and various other changes, omissions and deviations in the form and detail thereof may be made without departing from the spirit and scope of this invention.

What is claimed is:

1. A parallel path printing system for use in a high velocity document processing system using lower velocity print technology, the document processing system having a transport path and a system transport velocity, the printing system comprising:

a diverting mechanism at an upstream end of the printing system, the diverting mechanism receiving documents from the transport path, the diverting mechanism having a first position for diverting documents at a first oblique angle to a first print module and a second position for diverting documents at a second oblique angle to a second print module, the diverting mechanism alternately diverting consecutive transported documents to the first and second print modules;

the first print module comprising a first print transport and a first print head positioned at a downstream end of the first print transport, the first print transport controlled by a controller according to a predetermined motion profile, whereby the first print transport decelerates to a nominal print velocity prior to a printing operation in a first segment, maintains the nominal print velocity during printing in a second segment, and accelerates the first print transport back to the transport velocity in a third segment, after completion of printing;

a second printing module, parallel to the first printing module, comprising a second print transport and a second print head positioned at a downstream end of the second print transport, the second print transport controlled by the controller according to the predetermined motion profile, whereby the second print transport decelerates to the nominal print velocity prior to printing operation in the first segment, maintains the nominal print velocity during printing in the second segment, and accelerates the second print transport back to the transport velocity in the third segment, after completion of printing;

a merging mechanism downstream of the first and second print modules, the merging mechanism combining document outputs of the first and second print modules back into a single output transport path;

a first divert transport between the diverter mechanism and the first print module, the first divert transport receiving documents diverted from the diverter mechanism and transporting them at the first oblique angle to the first print module, the first divert transport operating at the transport velocity; and a second divert transport between the diverter mechanism and the second print module, the second divert transport receiving documents diverted from the diverter mechanism and transporting them at the second oblique angle to the second print module, the second divert transport operating at the transport velocity.

2. The parallel path printing system as recited in claim 1, wherein the merging mechanism comprises:

a first merge transport receiving documents from the downstream end of the first print transport module and transporting the documents to the output transport path, the first merge transport operating at the system transport velocity; and a second merge transport receiving documents from the downstream end of the second print transport module and transporting the documents to the output transport path, the second merge transport operating at the system transport velocity.

3. The parallel path printing system as recited in claim 1 wherein the diverting mechanism comprises a flipper gate.

4. The parallel path printing system as recited in claim 1 wherein the transport path is on a horizontal plane and transports horizontally oriented documents to the printing system, and wherein the diverting mechanism alternately diverts transported documents above the horizontal plane of the transport path to the first print module and below the horizontal plane of the transport path to the second print module, the first print module located substantially above the second print module.

5. The parallel path printing system as recited in claim 2 wherein the transport path is on a horizontal plane and transports horizontally oriented documents to the printing system, and wherein the diverting mechanism alternately diverts transported documents to a left transport path to the first print module and to a right transport path to the second print module, the first and second print modules located substantially side-by-side to one another.

6. The parallel path printing system as recited in claim 1 wherein the transport path is on at an angle plane between vertical and horizontal and transports angled documents to the printing system, and wherein the diverting mechanism alternately diverts transported documents to a left side of the transport path to the first print module and to a right side of the transport path to the second print module, the first and second print modules located substantially next to one another.

7. The parallel path printing system as recited in claim 2 wherein the transport path is on a vertical plane and transports vertically oriented documents to the printing system, and wherein the diverting mechanism alternately diverts transported documents to a left side of the vertical plane of the transport path to the first print module and to a right side of the vertical plane of the transport path to the second print module, the first and second print modules located substantially next to one another.

8. A parallel path printing system for use in a high velocity document processing system using lower velocity print technology, the document processing system having a transport path and a system transport velocity, the printing system comprising:

a diverting mechanism at an upstream end of the printing system, the diverting mechanism receiving documents from the transport path, the diverting mechanism having a first position for diverting documents at a first oblique angle to a first print module and a second position for diverting documents at a second oblique angle to a second print module, the diverting mechanism alternately diverting consecutive transported documents to the first and second print modules;

the first print module comprising a first print transport and a first print head positioned at a downstream end of the first print transport, the first print transport controlled by a controller according to a predetermined motion profile, whereby the first print transport decelerates to a nominal print velocity prior to a printing operation in a first segment, maintains the nominal print velocity during printing in a second segment, and accelerates the first print transport back to the transport velocity in a third segment, after completion of printing;

a second printing module, parallel to the first printing module, comprising a second print transport and a second print head positioned at a downstream end of the second print transport, the second print transport controlled by the controller according to the predetermined motion profile, whereby the second print transport decelerates to the nominal print velocity prior to printing operation in the first segment, maintains the nominal print velocity during printing in the second segment, and accelerates the second print transport back to the transport velocity in the third segment, after completion of printing;

a merging mechanism downstream of the first and second print modules, the merging mechanism combining document outputs of the first and second print modules back into a single output transport path;

wherein the transport path periodically stops as a result of stoppage conditions detected in the document processing system, the transport path further comprising upstream and downstream transports before and after the parallel path printing system, and wherein the first and second print transports are controlled by the controller to decelerate to a stop upon the occurrence of stoppage conditions in the document processing system, the deceleration controlled by the controller in accordance with a predetermined algorithm to maintain a relative displacement of the first and second print transports with respect to upstream or downstream transports to maintain relative displacements that would have occurred under the predetermined motion profile under nominal conditions, the predetermined algorithm determining the displacement of the print transports as a function of displacement of upstream or downstream transports.

9. The parallel path printing system in accordance with claim 8 wherein the controller further controls the first and second print transports to accelerate from a stop back to nominal condition upon the occurrence of a restart command after the stoppage condition, the acceleration controlled by the controller in accordance with the predetermined algorithm to maintain the relative displacement of the print transports with respect to upstream or downstream transports to maintain the relative displacements that would have occurred under the predetermined motion profile under nominal conditions, the predetermined algorithm determining the displacement of the print transport as a function of displacement of upstream or downstream transports.

10. The parallel path printing system of claim 9 wherein the predetermined algorithm for determining relative displacements includes a first function for accounting for changes in relative displacements that would have occurred during deceleration of the print transports in the first segment of the motion profile, a second function for accounting for changes in relative displacements that would have occurred during the reduced nominal print velocity of the second segment of the motion profile, and a third function for accounting for changes in relative displacements that would have occurred during acceleration of the print transport in the third segment of the motion profile, the appropriate of the first, second, and third functions being invoked by the controller based on the position documents in the print transports during the occurrence of the stoppage condition.

11. A parallel path printing system for use in a high velocity document processing system using lower velocity print technology, the document processing system having a transport path and a system transport velocity, the printing system comprising:

a diverting mechanism at an upstream end of the printing system, the diverting mechanism receiving documents from the transport path, the diverting mechanism having a first position for diverting documents at a first oblique angle to a first print module and a second position for diverting documents at a second oblique angle to a second print module, the diverting mechanism alternately diverting consecutive transported documents to the first and second print modules;

the first print module comprising a first print transport and a first print head positioned at a downstream end of the first print transport, the first print transport controlled by a controller according to a predetermined motion profile, whereby the first print transport decelerates to a nominal print velocity prior to a printing operation in a first segment, maintains the nominal print velocity during printing in a second segment, and accelerates the first print transport back to the transport velocity in a third segment, after completion of printing;

a second printing module, parallel to the first printing module, comprising a second print transport and a second print head positioned at a downstream end of the second print transport, the second print transport controlled by the controller according to the predetermined motion profile, whereby the second print transport decelerates to the nominal print velocity prior to printing operation in the first segment, maintains the nominal print velocity during printing in the second segment, and accelerates the second print transport back to the transport velocity in the third segment, after completion of printing;

a merging mechanism downstream of the first and second print modules, the merging mechanism combining document outputs of the first and second print modules back into a single output transport path; and wherein the first and second print heads are electronically or mechanically geared to the respective first and second print transports so that variations in print transport velocity resulting from stoppage conditions during a printing operation will not affect an image being printed.

12. A parallel path printing system for use in a high velocity document processing system using lower velocity print technology, the document processing system having a transport path and a system transport velocity, the printing system comprising:

a diverting mechanism at an upstream end of the printing system, the diverting mechanism receiving documents from the transport path, the diverting mechanism having a first position for diverting documents at a first oblique angle to a first print module and a second position for diverting documents at a second oblique angle to a second print module, the diverting mechanism alternately diverting consecutive transported documents to the first and second print modules;

the first print module comprising a first print transport and a first print head positioned at a downstream end of the first print transport, the first print transport controlled by a controller according to a predetermined motion profile, whereby the first print transport decelerates to a nominal print velocity prior to a printing operation in a first segment, maintains the nominal print velocity during printing in a second segment, and accelerates the first print transport back to the transport velocity in a third segment, after completion of printing;

a second printing module, parallel to the first printing module, comprising a second print transport and a second print head positioned at a downstream end of the second print transport, the second print transport controlled by the controller according to the predetermined motion profile, whereby the second print transport decelerates to the nominal print velocity prior to printing operation in the first segment, maintains the nominal print velocity during printing in the second segment, and accelerates the second print transport back to the transport velocity in the third segment, after completion of printing;

a merging mechanism downstream of the first and second print modules, the merging mechanism combining document outputs of the first and second print modules back into a single output transport path; and wherein the first and second print heads are geared to operate at a same velocity as the respective first and second print transports.

13. The parallel path print system of claim 12 wherein the print heads are mechanically geared to the print transports.

14. The parallel path print system of claim 12 wherein the print heads are electronically geared to the print transports.

15. A method for parallel path printing for use in a high velocity document processing system using lower velocity print technology, the document processing system having a transport path and a system transport velocity, the method comprising:

transporting documents at the system transport velocity in the transport path;

alternately diverting consecutive documents from the transport path to a first print module and to a second print module;

printing an image on documents in the print modules;

while one or more documents are within the print modules during nominal system conditions, controlling the velocity of the print modules in accordance with a motion profile, whereby the motion profile includes the steps of decelerating documents to a print velocity, maintaining the print velocity during the step of printing, and accelerating the documents to the transport velocity after the step of printing is complete; and merging documents downstream from the first and second print modules back into a single output transport path;

wherein the motion profile results in relative displacements of documents to vary with respect to upstream and downstream documents during the motion profile, the method further including the steps of:

while one or more documents are within the first and second print modules during a stoppage condition, decelerating the documents to a stop, the step of decelerating to the stop including the step of maintaining relative displacements of documents on the print transport with respect to upstream and downstream documents, the step of maintaining the relative displacements including controlling deceleration of the first and second modules according to a predetermined algorithm describing relative displacements between documents as such displacements would have occurred under the motion profile under nominal conditions, the predetermined algorithm determining the displacements of the first and second print modules as a function of displacement of upstream or downstream transports.

16. The parallel path printing method in accordance with claim 15 further comprising the steps of:

restarting the first and second print modules after the stoppage condition, the step of restarting including the step of accelerating documents from the stop to a velocity of the motion profile, the step of accelerating including the step of maintaining the relative displacement of documents in the print modules with respect to upstream and downstream documents, the step of maintaining the relative displacements including controlling the accelerations of the print modules according to the predetermined algorithm.

17. The parallel path printing method claim 16 wherein the predetermined algorithm for determining relative displacements includes a first function accounting for changes in relative displacements that would have occurred during deceleration of the print modules in the first segment of the motion profile, a second function accounting for changes in relative displacements that would have occurred during the reduced nominal print velocity of the second segment of the motion profile, and a third function accounting for changes in relative displacements that would have occurred during acceleration of the print modules in the third segment of the motion profile, and the method further including the step of invoking the appropriate of the first, second, and third functions based on the position of the document in the first and second print modules during the occurrence of the stoppage condition.

18. The parallel path printing method as recited in claim 15 wherein the step of transporting documents in the transport path further comprises transporting horizontally oriented documents, and wherein the step of diverting further comprises alternately diverting consecutive documents above a horizontal plane of the transport path to the first print module and below the horizontal plane of the transport path to the second print module.

19. The parallel path printing method as recited in claim 15 wherein the step of transporting documents in the transport path further comprises transporting vertically oriented documents, and wherein the step of diverting further comprises alternately diverts consecutive documents to a left side of a vertical plane of the transport path to the first print module and to a right side of the vertical plane of the transport path to the second print module.

20. A method for parallel path printing for use in a high velocity document processing system using lower velocity print technology, the document processing system having a transport path and a system transport velocity, the method comprising:

transporting documents at the system transport velocity in the transport path;

alternately diverting consecutive documents from the transport path to a first print module and to a second print module;

printing an image on documents in the print modules;

while one or more documents are within the print modules during nominal system conditions, controlling the velocity of the print modules in accordance with a motion profile, whereby the motion profile includes the steps of decelerating documents to a print velocity, maintaining the print velocity during the step of printing, and accelerating the documents to the transport velocity after the step of printing is complete; and merging documents downstream from the first and second print modules back into a single output transport path; and wherein a step of electronically or mechanically gearing the printing step to the respective first or second print module motion so that variations in print module velocity resulting from stoppage conditions during the printing step will not affect the image being printed.

* * * * *